P. H. JACKSON.
Apparatus for Testing Girders.
No. 134,549. Patented Jan. 7, 1873.

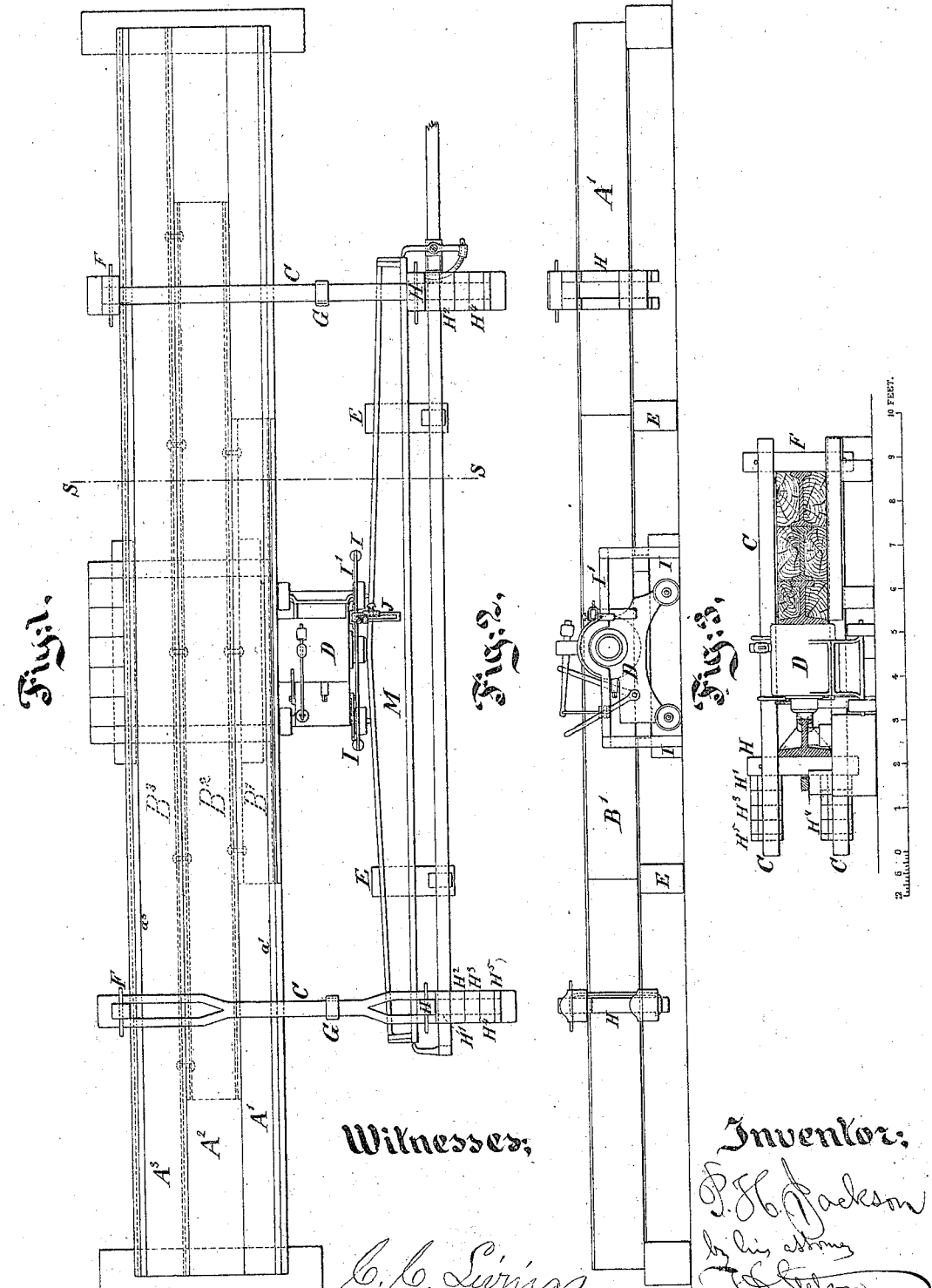

2 Sheets--Sheet 2.

Witnesses:
C. C. Living
Arnold Hoermann

Inventor,
Peter H. Jackson
by his attorney
G. B. Stetson

UNITED STATES PATENT OFFICE.

PETER H. JACKSON, OF NEW YORK, N. Y.

IMPROVEMENT IN APPARATUS FOR TESTING GIRDERS.

Specification forming part of Letters Patent No. 134,549, dated January 7, 1873.

*To all whom it may concern:*

Be it known that I, PETER H. JACKSON, of the firm of J. L. JACKSON & BROTHER, of New York city, in the State of New York, have invented an Improvement in Apparatus for Testing Girders, of which the following is a specification:

The importance of practically testing girders to determine not only their capacity to endure a given weight but also their amount of deflection or bending under such weight, and the existence of a permanent set when such occurs, has lately attracted much attention. The means for testing have been heretofore imperfect, and have involved considerable labor and inconvenience in their use. The present invention has been called forth by much experience in this important branch of labor. The difficulties in testing the amount of deflection are much greater than in testing the absolute strength. A hydraulic ram of sufficient force being provided, it is easy, by the aid of a hand lever or otherwise, to induce the small amount of motion required for any necessary degree of strain. It is easy, by a loaded valve or small piston, to determine with reasonable accuracy the amount of the strain. But indications of the amount of the deflection are liable to be disturbed by a host of circumstances. I provide a strong and nearly inflexible beam or abutment of rectangular section, so much stronger than the beams which are to be tested that its deflection is insignificant, and I mount the instrument which determines the deflection independently on the earth, and thus obtain its indications entirely independent even of the slight deflection of the abutment-beam. I make the amount of deflection apparent to the eye at each moment as the load increases, by employing an index, which, actuated by a gentle spring, follows the girder as it yields. The starting point for the deflection is very simply and rapidly adjustable, so that no time is lost in preparing the instrument to indicate exactly the amount of deflection of beams of different forms and sizes. The apparatus is provided with massive movable clamps, which can take hold of beams of different lengths always by their ends, and I provide chock pieces or blocks which fill up these clamps with great facility to varying extents to adapt them for all the different cases in practice.

The following is a description of what I consider the best means of carrying out the invention.

The accompanying drawing forms a part of this specification.

Figure 4:
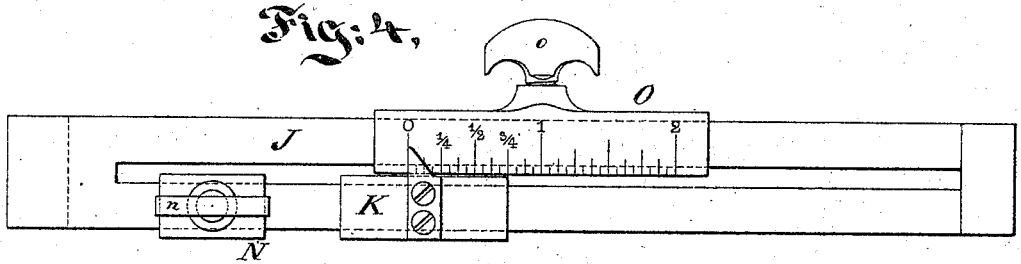
Figure 5:
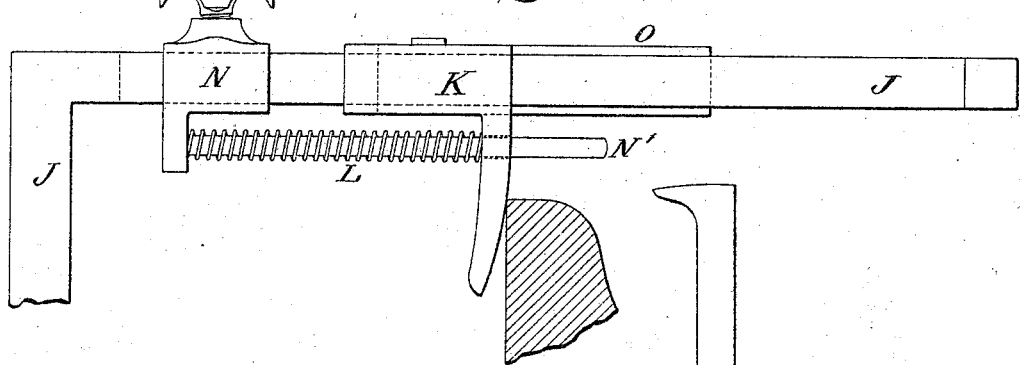
Figure 6:
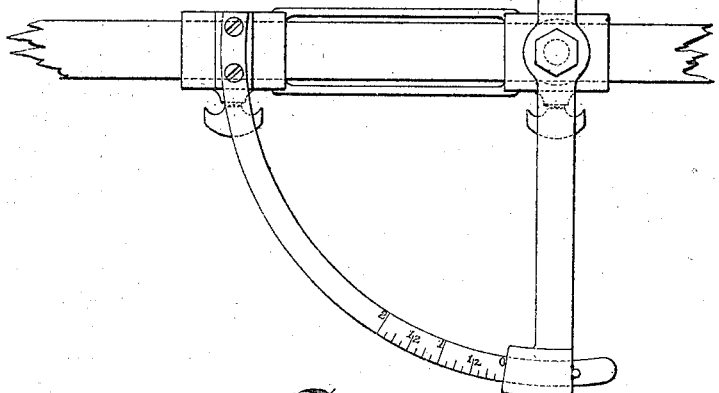
Figure 7:
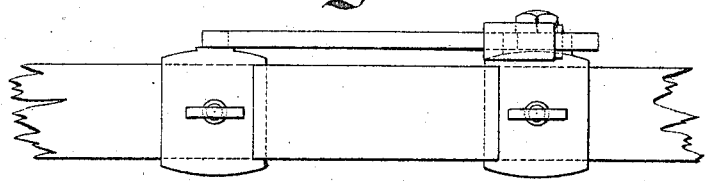

Figure 1 is a plan view of the entire apparatus with a girder in place in the act of being tested. Fig. 2 is a front view with the girder removed. Fig. 3 is a cross-section with the girder in place. The remaining figures show details on a larger scale. Fig. 4 is a plan view, and Fig. 5 is a vertical elevation of parts which are used to determine the deflection. Fig. 6 is a plan, and Fig. 7 is an elevation of parts which are used solely to determine the longitudinal change of dimension or stretch of a girder under strain.

These latter instruments are used mainly on highly-arched girders, where any deflection is accompanied by a necessarily large extension longitudinally. Their use will be sufficiently obvious from the drawing, and as I do not seek to secure them by Letters Patent there will be no further reference thereto.

Similar letters of reference indicate corresponding parts in all the figures.

$A^1$ $A^2$ $A^3$ are stout balks of pine timber, and $B^1$ $B^2$ $B^3$ are heavy wrought-iron beams let in between these timbers, so that when the whole are properly applied together, as shown, they form a beam of great stiffness, and practically rectangular in its section. It is in a convenient form for applying the movable clamps C at different points in its length and for sliding them with facility outward and inward. The upper faces of the timbers $A^1$ and $A^3$ are provided with bars of iron $a^1$ $a^3$, which form ways on which the heavy clamps C may rest and slide in the course of the rapid adjustments which are frequently necessary. The upper faces of the timbers may be marked off permanently to indicate the feet and inches to facilitate the placing of the clamps C C, always at exactly equal distances from the central line. The hydraulic ram is marked D, and may be of any ordinary or suitable construction. I have employed in my experiments an English ram, mounted on wheels for convenience of occasional movements, though it is never required to be moved in my method of testing, but is always permanently located in the central line of the apparatus. There are four clamps, C C, two at each end, one below and one above the stout abutment-beam, which latter I will refer to collectively by the single letter A. The girder which is to be tested is marked M, and rests on pieces E, which may be changed and adjusted as required. The stout clamps C are held together at their back ends by links or stout keys F, and a little forward of the abutment-beam they are held again loosely together by stout clips G. The function of these latter is mainly to support the lowermost clamps when the girder is removed. In front of the girder the space is filled up with removable blocks H $H^1$ $H^2$ $H^3$, &c., one of which extends quite up and down, and the others may only fill each clamp. I provide a number of these blocks of different thicknesses, each adapted to properly apply on the clamps, and each of a practically uniform thickness throughout, so as to afford a fair bearing for the base of the girder. The construction of the clamps C C may vary greatly. They are represented as different at the two ends of the machine; but this will be understood as only a mode of showing two varieties of construction. Whichever clamp is adopted at one end will be adopted also at the other; and the blocks $H^1$ $H^2$ will always be adapted to the clamps, so as to fit over the clamp or to fit in it and between the open portions of the clamps, as may be required in either case, to allow of being easily and rapidly changed to accommodate different sizes of girders. The clamps may be drawn backward somewhat, and the removable blocks $H^1$ $H^2$ may be applied in the rear instead of in the front of the apparatus, when desired. This latter plan would afford some advantages in case a large number of girders of uniform size were to be tested, because there would be a smaller number of parts to be removed and replaced at the front for each operation.

To test a girder, the parts at the front are removed, and the girder, being brought into position in the clamps, is secured by a proper number of the blocks $H^1$ $H^2$ to make a tolerably close fit. The ram D may be operated by power, if preferred, but there is but little delay by operating it by hand-levers. To give the apparatus a great range, there may be two or more levers to operate the ram with different degrees of purchase—that is to say, one lever may pump the ram very quickly for tests of light girders, and the other may work the ram very slowly and powerfully for severer tests. The former will, of course, be used in the first portion of a test, even of a heavy girder. The girder being in place, and the ram being properly applied against the center of its length, I first apply a slight force to bring the parts to a fair bearing, and let it off again.

I have found by trial that with such girders as are used in New York city buildings a load of about one ton is required to bring the girder and the parts of the clamps and blocks fairly into contact. I have no reference to the physical or metaphysical arguments about the impossibility of actual contact of solids; but there is a practical point at which two bodies are pressed together with such force that their surfaces will not approach nearer, and which requires some considerable strain to attain.

Having determined by repeated trial that one ton or other moderate force is required to overcome the looseness of the parts and bring the surfaces to a fair bearing, I make this the initial point, and, applying the strain by degrees through the operation of the levers, attain the desired degree of pressure, note the amount of deflection, writing it usually on a memorandum-book, and then relieve the beam from the strain and note the permanent set, if any. I then take the beam out of the clamps, removing so many of the blocks $H^1$ $H^2$ as are employed at the front of the apparatus, and, introducing another beam, repeat the round of operations.

I will now describe the index-scale with its spring and adjustable zero, and the mode of mounting it as independently and reliably as possible. I drive stakes or plant posts in the earth, as indicated by I I, and connect them by a cross-bar, I', which stands close to the ram, but out of contact therewith. The cross-bar I' has a rectangular socket, as represented, which receives the vertical arm of an index-carrier, J, which extends out horizontally over the beam and supports the movable index with the scale, springs, &c. There may be a pinching-screw to hold the index-carrier J at different elevations, as may be necessary. An index, K, is adapted to move easily outward and inward on the horizontal arm of the index-carrier J, and is provided with a finger which reaches down and is adapted to press gently against the back surface of the girder which is to be tested. This movable part K is actuated by a coiled spring, L, which surrounds a rod, N', which extends forward from an adjustable piece, N, which is held by a pinching-screw, $n$, in any position on the horizontal arm in which it may be secured. There are two parallel parts of the horizontal arm of the part J. The piece N is fixed adjustably on one of them, and the index-piece K slides freely on the same side or branch. A nicely-graduated scale-piece, O, is mounted on the other and parallel branch of the part J, and is secured in any desired position by means of the pinching-screw $o$. The rod N' stands in a hole in the finger which reaches down from the piece K. When a beam is in place and the preliminary slight force has been applied to bring the parts to a bearing, the set-screw $n$ is slackened and the piece N is moved forward until the finger-piece K, touching the back side of the girder M, is arrested and prevented from moving forward further. Now the piece N is moved forcibly forward by the hand until it is nearly in contact with the piece K, and then secured in that position by tightening the pinching-screw n. In this condition of the parts the gentle pressure of the spring L is ready to be exerted over a considerable distance to press the sliding piece K forward as the beam is deflected. The next movement is to shift the scale-piece O forward until its zero coincides in position with the index on the piece K. Now the parts are ready, and on working the levers of the ram and inducing a strain on the girder the piece K slides forward as the girder deflects, and indicates by its index on the scale O exactly the amount of the deflection. On relaxing the strain of the ram either immediately or after holding the girder for a few seconds under the desired maximum amount of strain, the metal springs back usually to its original position and leaves the index K opposite to the zero point on the scale-piece O; but in case there is any permanent set, this fact and its amount is indicated. The facts that both the girder M and the abutment-beam A are supported at their ends, and that the index-support I is mounted independently on the earth, tend to render the indications very accurate and independent of any slight deflection of the abutment-beam. The abutment-beam A, should it spring under severe strains, its springing is unfelt by the girder or by the testing-index, which measures the actual amount of movement of the center of the girder, which is almost exactly the true amount of the deflection. But in case it shall be found under any circumstances that the ends of the beams tend to yield a little, so that it becomes important to determine the exact amount of the deflection of the abutment-beam A and its influence on the indications, I propose to determine this by a series of careful trials many times repeated with different lengths and strengths of girders, and to form a table by which the indications of the scale may be corrected to compensate for this slight source of error. I am able by this apparatus without such correction to get very exact indications. By such corrections I believe it is possible to obtain a high degree of mathematical accuracy.

I attach much importance in practice to my movable blocks $H^1$ $H^2$, &c. The difference in practice between the use of these and of screw threads and nuts makes the difference between a successful practical machine and a mere theoretical scheme. Much importance is also attached to the practically-inflexible abutment-beam A and to the mounting of the index apparatus on the earth, so as to be practically independent of any slight deflection of which the abutment-beam, in spite of its immense resistant force, may be susceptible.

I claim as my invention—

1. In a machine for testing girders, the abutment-beam herein described, consisting of the wooden timbers $A^1$ $A^2$ $A^3$, wrought-iron beams $B^1$ $B^2$ $B^3$, and iron bars $a^1$ $a^3$, in combination with the clamps C, blocks $H^1$ $H^2$, and ram D, when constructed, arranged, and operating as herein shown and described.

2. The movable piece K, adapted to press against the back of the girder M under the influence of the spring L, abutting against an adjustable piece N, and operating to indicate to the eye the exact amount of the deflection at each instant as the strain increases, all substantially as and for the purposes herein set forth.

3. The adjustable index-piece O, in combination with the movable piece K and spring L, to allow the zero to be rapidly brought to and held in any desired position to accommodate different sizes and forms of girders to be tested.

In testimony whereof I have hereunto set my name in the presence of two subscribing witnesses.

PETER H. JACKSON.

Witnesses:
 THOMAS D. STETSON,
 ARNOLD HOERMANN.